US006436880B1

(12) United States Patent
Frenier

(10) Patent No.: US 6,436,880 B1
(45) Date of Patent: Aug. 20, 2002

(54) WELL TREATMENT FLUIDS COMPRISING CHELATING AGENTS

(75) Inventor: Wayne W. Frenier, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/563,557

(22) Filed: May 3, 2000

(51) Int. Cl.⁷ .............................. C09K 7/02; C09K 3/00
(52) U.S. Cl. ...................... 507/244; 507/90; 507/131; 507/927; 507/939
(58) Field of Search ................................. 507/131, 244, 507/90, 927, 939

(56) References Cited

U.S. PATENT DOCUMENTS

| | | | |
|---|---|---|---|
| 4,430,128 A | 2/1984 | Frenier et al. | 134/3 |
| 4,623,399 A | 11/1986 | Frenier et al. | 134/3 |
| 4,636,327 A | 1/1987 | Frenier et al. | 252/87 |
| 4,734,259 A | * 3/1988 | Frenier | 507/131 |
| 4,888,121 A | 12/1989 | Dill et al. | |
| 5,458,860 A | 10/1995 | Morris et al. | |
| 5,972,868 A | 10/1999 | Athey et al. | |

OTHER PUBLICATIONS

Fredd, C.N., and Fogler, H.S., "Chelating Agents as Effective Matrix Stimulation Fluids for Carbonates," SPE 37212 (1997).

Fredd, C. N., and H. S. Fogler, "The Influence of Chelating Agents on the Kinetics of Calcite Dissolution," *J. Coll. & Interface. Sci.* 204, 187–197 (1998).

Fredd, C. N., and H. S. Fogler, "Alternative Stimulation Fluids and their Impact on Carbonate Acidizing," SPE 31074 (1996).

Fredd, C. N., et al., "The Existence of an Optimum Damkholer Number for Matrix Stimulation of Carbonate Formations," SPE 38167 (1997).

* cited by examiner

*Primary Examiner*—Philip Tucker
(74) *Attorney, Agent, or Firm*—Robin C Nava; Catherine Menes; Brigitte Jeffery

(57) ABSTRACT

An acidic fluid that is useful in stimulation and workover operations, and in particular, for the control of iron in acidizing operations, the removal of alkaline earth carbonate scale in scale removal operations, and matrix or fracture acidizing operations, comprises an acid, such as hydrochloric acid; water; and a hydroxyethylaminocarboxylic acid. Preferred hydroxyethylaminocarboxylic acids are hydroxyethylethylenediaminetriacetic acid (HEDTA) and hydroxyethyliminodiacetic acid (HEIDA). Also disclosed herein are methods of controlling iron, removing alkaline earth carbonate scale, or matrix or fracture acidizing, involving the use of the acidic fluid.

49 Claims, No Drawings

WELL TREATMENT FLUIDS COMPRISING CHELATING AGENTS

TECHNICAL FIELD OF THE INVENTION

This invention relates to the stimulation of hydrocarbon wells and in particular to acid fluids and methods of using such fluids in treating a subterranean formation having low permeability.

BACKGROUND OF THE INVENTION

Hydrocarbons (oil, natural gas, etc.) are obtained from a subterranean geologic formation (i.e., a "reservoir") by drilling a well that penetrates the hydrocarbon-bearing formation. This provides a partial flowpath for the oil to reach the surface. In order for oil to be "produced," that is travel from the formation to the wellbore (and ultimately to the surface), there must be a sufficiently unimpeded flowpath from the formation to the wellbore. This flowpath is through the formation rock—e.g., sandstone, carbonates—which has pores of sufficient size and number to allow a conduit for the oil to move through the formation.

Hence, one of the most common reasons for a decline in oil production is "damage" to the formation that plugs the rock pores and therefore impedes the flow of oil. This damage often arises from another fluid deliberately injected into the wellbore, for instance, drilling fluid. Even after drilling, some drilling fluid remains in the region of the formation near the wellbore, which may dehydrate and form a coating on the wellbore. The natural effect of this coating is to decrease permeability to oil moving from the formation in the direction of the wellbore.

Another reason for lower-than-expected production is that the formation is naturally "tight" (low permeability formation), that is, the pores are sufficiently small that the oil migrates toward the wellbore only very slowly. The common denominator in both cases (damage and naturally tight reservoirs) is low permeability.

Techniques performed by hydrocarbon producers to increase the net permeability of the reservoir are referred to as "stimulation." Essentially, one can perform a stimulation technique by: (1) injecting chemicals into the wellbore to react with and dissolve the damage (e.g., wellbore coating); (2) injecting chemicals through the wellbore and into the formation to react with and dissolve small portions of the formation to create alternative flowpaths for the hydrocarbon (thus rather than removing the damage, redirecting the migrating oil around the damage); or (3) injecting chemicals through the wellbore and into the formation at pressures sufficient to fracture the formation, thereby creating a large flow channel though which hydrocarbon can more readily move from the formation and into the wellbore. The present invention is directed to all three processes.

Thus, the present invention relates to methods to enhance the productivity of hydrocarbon wells (e.g., oil wells) by creating alternate flowpaths by removing portions of a wellbore coating, dissolving small portions of the formation, or removing (by dissolution) near-wellbore formation damage. Generally speaking, acids or acid-based fluids are useful for this purpose due to their ability to dissolve both formation minerals and contaminants (e.g., drilling fluid coating the wellbore or that has penetrated the formation) which were introduced into the wellbore/formation during drilling or remedial operations.

The most common agents used in acid treatments of wells are mineral acids such as hydrochloric acid, which was disclosed as the fluid of choice in a patent issued over 100 years ago (U.S. Pat. No. 556,669, Increasing the Flow of Oil Wells). At present, hydrochloric acid is still the preferred acid treatment in carbonate formations. For sandstone formations, the preferred fluid is a hydrochloric/hydrofluoric acid mixture.

At present, acid treatments are plagued by three limitations: (1) radial penetration; (2) corrosion of the pumping and well bore tubing, and (3) the precipitation of iron dissolved from the formation, tubing, or surface equipment in the course of treatment.

The first problem, radial penetration, is caused by the fact that as soon as the acid is introduced into the formation (or wellbore) it reacts very quickly with the formation matrix (e.g., sandstone or carbonate), and/or the wellbore coating. In the case of treatments within the formation (rather than wellbore treatments) the portion of the formation that is near the wellbore and that first contacts the acid is adequately treated, though portions of the formation more distal to the wellbore (as one moves radially outward from the wellbore) remain untouched by the acid, because all of the acid reacts before it can get there.

For instance, sandstone formations are often treated with a mixture of hydrofluoric and hydrochloric acids at very low injection rates (to avoid fracturing the formation). This acid mixture is often selected because it will dissolve clays (found in drilling mud) as well as the primary constituents of naturally occurring sandstones (e.g., silica, feldspar, and calcareous material). In fact, the dissolution is so rapid that the injected acid is essentially spent by the time it reaches a few inches beyond the wellbore. Thus, it has been calculated that 117 gallons of acid per foot is required to fill a region five feet from the wellbore (assuming 20% porosity and 6-inch wellbore diameter). See, Acidizing Fundamentals, 5,6, in Acidizing Fundamentals SPE (1994). Yet a far greater amount of acid than this would be required to achieve radial penetration of even a single foot, if a conventional fluid (HCl) were used.

Similarly, in carbonate formations, the preferred acid is hydrochloric acid, which again reacts so quickly with limestone and dolomite (primary components of carbonate formations) that acid penetration is limited to a few inches to a few feet. In fact, due to such limited penetration, it is believed that matrix treatments are limited to bypassing near-wellbore flow restrictions. Yet low permeability at any point along the hydrocarbon flowpath can impede flow (hence production). Ibid. Therefore, because of the prodigious fluid volumes required, these treatments are severely limited by their cost.

In response to this "radial penetration" problem, organic acids (e.g., formic acid, acetic acid) are sometimes used, since they react more slowly than mineral acids such as HCl. However, organic acids are an imperfect solution. First, they are far more expensive than mineral acids. Second, while they have a lower reaction rate, they also have a much lower reactivity—in fact, they do not react to completion, but rather an equilibrium with the formation rock is established. Hence one mole of CHl yields one mole of available acid (i.e., H$^+$), but one mole of acetic acid yields substantially less than one mole of available acid.

A third general class of acid treatment fluids (the first two being mineral acids and organic acids) have evolved in response to the need to reduce corrosivity and prolong the migration of unspent acid radially away from the wellbore. This general class of compounds is often referred to as "retarded acid systems." The common idea behind these systems is that the acid reaction rate is slowed down, for example, by emulsifying the acid with an oil and a surfactant, or oil-wetting the formation. These approaches also have problems that limit their use.

Emulsified acids are seldom used in matrix acidizing since the increased viscosity makes the fluid more difficult to pump. Similarly, chemically retarded acids (e.g., prepared by adding an oil-wetting surfactant to acid in an effort to create a barrier to acid migration to the rock surface) often require continuous injection of oil during the treatment. Moreover these systems are often ineffective at high formation temperatures and high flow rates since absorption of the surfactant on the formation rock is diminished. Emulsified acid systems are also limited by increased frictional resistance to flow.

The second significant limitation of acid treatments is the corrosion of the pumping equipment and well tubings and casings, caused by contact with the acid (worse in the case of more concentrated solutions of mineral acids). To solve the corrosion problem, conventional acid treatments often add a corrosion inhibitor to the fluid; however, this can significantly increase the cost of an acidizing treatment.

Another ubiquitous problem with acid treatments is iron precipitation, especially in sour wells (i.e., wells in which the oil has a relatively high sulfur content) or carbonate formations. There is a tendency for iron sulfide scale to form in boreholes and/or formations, especially in sour wells. The acid used to treat the well can dissolve the iron sulfide, but in the process hydrogen sulfide is generated. $H_2S$ is toxic and stimulates corrosion. In addition, the dissolved iron will tend to precipitate, in the form of ferric hydroxide or ferric sulfide, as the acid in the treatment fluid becomes spent (i.e., fully reacted) and the pH of the fluid increases. Such precipitation of iron is highly undesirable because of the damage it can do to the permeability of the formation. Therefore, acid treatment fluids often contain additives to minimize iron precipitation and $H_2S$ evolution, for example by sequestering the Fe ions in solution using chelating agents, such as ethylenediaminetetraacetic acid (EDTA).

U.S. Pat. No. 4,888,121, Compositions and Method for Controlling Precipitation When Acidizing Sour Wells, discloses an acidizing composition that includes an acid such as CHl; an iron sequestering agent such as citric acid, EDTA, or nitrilotriacetic acid (NTA); and a sulfide modifier such as formaldehyde. This composition is stated to inhibit precipitation of ferric hydroxide, ferrous sulfide, and free sulfur, during the well acidizing treatment.

Although the above treatment fluid can help control iron precipitation, in some situations effective control would require the use of so much material that the treatment cost would become excessive. This is especially true for treatment fluid comprising EDTA, which has relatively low solubility in acidic fluids (e.g. pH≦4).

As evidenced by the reference cited above, an acid well treatment fluid that is relatively inexpensive and can readily control precipitation of iron is a long-sought after and highly desirable goal. It would further be desirable if the acid well treatment fluid could lead to improved radial penetration than is commonly seen for acid well treatment fluids known in the art, and it is additionally desirable that the acid well treatment fluid could be used in either matrix acidizing or fracture acidizing treatments. It would also be desirable for the acid well treatment fluid to be useful in control of scale, such as alkaline earth carbonate scales in a wellbore in a carbonate formation.

Athey et al., U.S. Pat. No. 5,972,868, Method for Controlling Alkaline Earth and Transition Metal Scaling with 2-Hydroxyethyl Iminodiacetic Acid, disclose compositions comprising 2-hydroxyethyliminodiacetic acid as a chelant for the removal of alkaline earth scale in downhole equipment. The compositions can be at any pH from about 2 to about 13.

SUMMARY OF THE INVENTION

In a general sense, the present invention relates to the use of acidic fluids in stimulation and workover operations, and in particular, in matrix acidizing or fracture acidizing treatments. One embodiment of the invention is a well treatment fluid composition that comprises: a first acid; water; and a hydroxyethylaminocarboxylic acid. Preferably, the hydroxyethylaminocarboxylic acid is selected from hydroxyethylethylenediaminetriacetic acid (HEDTA), hydroxyethyliminodiacetic acid (HEIDA), or a mixture thereof.

The first acid can be, for example, a non-oxidizing mineral acid, such as hydrochloric acid, hydrofluoric acid, or a mixture thereof. Alternatively, the acid can be a non-oxidizing organic acid, such as formic acid, acetic acid, or a mixture thereof. The hydroxyethylaminocarboxylic acid can be in the form of a free acid, a sodium salt, a potassium salt, or an ammonium salt. The composition can optionally further comprise one or more additives selected from the group consisting of surfactants, corrosion inhibitors, stabilizers, sequestering agents, viscosity modifying agents, and pH control agents. Preferably, it comprises a corrosion inhibitor. If the formulation comprises CHl, preferably the corrosion inhibitor comprises an amine or a quaternary nitrogen compound, and an unsaturated oxygen compound. If the formulation comprises an organic acid, preferably the corrosion inhibitor comprises quaternary nitrogen salt and a sulfur compound. More preferably, the corrosion inhibitor comprises a quaternary ammonium compound and a reduced sulfur compound (i.e. a compound comprising $S^{-2}$). Examples of quaternary ammonium compounds include pyrridonium and quinolinium salts, or complex amines. Reduced sulfur compounds include sulfides, mercaptans, thioureas, thiols, thioacids, and thioamides, among others. Examples of unsaturated oxygen compounds include acetylenic alcohols, unsaturated aldehydes, and phenyl vinyl ketones.

Another aspect of the present invention is a method of acid-treating a subterranean formation. The method includes the step of injecting a well treatment fluid composition via a wellbore into a subterranean formation. In one embodiment, the well treatment fluid composition comprises the components described above. Although the injection step is preferably performed at a fluid pressure that is less than the minimum in situ rock stress (i.e., a matrix acidizing method), the method can also be performed at a higher pressure (i.e., an acid fracturing method). The method can also be used to remove deposits from the wellbore. In another embodiment of this aspect, the well treatment fluid comprises water and a hydroxyethylaminocarboxylic acid. In this embodiment, the pH of the well treatment fluid is less than about 12, more preferably from about 1 to about 4, and can be controlled by an organic acid, a mineral acid, or a base.

Yet another aspect of the present invention is a method of removing alkaline earth carbonate scale from a wellbore. The method includes injecting a well treatment fluid composition via the wellbore, the well treatment fluid composition comprising a first acid; water; a hydroxyethylaminocarboxylic acid; and a corrosion inhibitor comprising a quaternary ammonium compound and a reduced sulfur compound. The alkaline earth carbonate scale can be present in any portion of the wellbore, such as in a gravel pack or screen.

The compositions and methods of the present invention provide several substantial advantages over prior stimulation and workover fluids and methods. The present invention provides hydroxyethylaminocarboxylic acids as iron control agents which are readily soluble in acidic aqueous solutions. The hydroxyethylaminocarboxylic acids are also effective in removing alkaline earth carbonates from a wellbore. Also, the hydroxyethylaminocarboxylic acids are themselves acidic, and thus can be used as the acidizing component in a matrix acidizing or fracture acidizing method; in addition, they have a relatively low reactivity, and therefore can exhibit greater radial penetration than is generally seen for mineral acid acidizing treatments. It has been discovered that hydroxyethylaminocarboxylic acids are very soluble in mineral acids or organic acids, and can be mixed with mineral acids or organic acids to provide a wide range of useful formulations.

DETAILED DESCRIPTION OF PREFERRED EMBODIMENTS

Components of the Well Treatment Fluid

The first acids that can be used in the compositions and methods of the present invention are those that are well-known in the art. Examples of first acids include non-oxidizing mineral acids such as hydrochloric acid, sulfuric acid, phosphoric acid, hydrofluoric acid, and mixtures thereof. Other examples include non-oxidizing organic acids such as formic acid, acetic acid, and mixtures thereof. These acids will typically be used as an aqueous solution or as an emulsified foam. One of skill in the art will recognize that sulfuric acid is generally not preferred if the composition is intended for use in treating calcium- or magnesium-bearing formations or scales.

The compositions and methods of the present invention include hydroxyethylaminocarboxylic acids. By "hydroxyethylaminocarboxylic acid" is meant a compound comprising at least one carboxylic acid moiety and at least one >N—CH$_2$—CH$_2$—OH ("hydroxyethylamino") moiety. (It should be noted that compounds wherein the nitrogen can form either two single bonds to other atoms or one double bond to a single atom in the remainder of the compound are included within the definition). Preferred examples of hydroxyethylaminocarboxylic acids include hydroxyethylethylenediaminetriacetic acid (HEDTA), hydroxyethyliminodiacetic acid (HEIDA), or a mixture thereof. HEDTA comprises three carboxylic acid moieties and one hydroxyethylamino moiety, whereas HEIDA comprises two carboxylic acid moieties and one hydroxyethylamino moiety.

Hydroxyethylaminocarboxylic acids provide a number of benefits to the well treatment fluids of the present invention. First, they are soluble in aqueous acidic solutions to a much greater extent than is EDTA.

The composition can also include one or more additives that are compatible with the acid composition, such as surfactants, corrosion inhibitors (such as the alkylphenones described in U.S. Pat. Nos. 5,013,483 and 5,096,618), stabilizers, solvents, iron reducing agents, viscosity modifying agents, wetting agents, emulsifiers, non-emulsifiers, and pH control agents. Many such additives are well known in the art. Corrosion inhibitors in particular should be selected with reference to the particular acid used in the composition.

If the composition is intended for use in a method of scale removal (as will be described in more detail below), the use of a corrosion inhibitor is especially desirable. Preferably, the corrosion inhibitor comprises a nitrogen compound and a sulfur compound, more preferably a quaternary ammonium compound and a reduced sulfur compound.

If a reducing agent is used in the composition, the reducing agent preferably comprises an organic reducing agent, more preferably an isomeric ascorbic acid selected from D-erythorbic acid, L-ascorbic acid, D-xyloascorbic acid, or L-araboascorbic acid.

A non-emulsifier can be used with compositions comprising CHl or other mineral acids. The non-emulsifier is typically a surfactant, usually an anionic surfactant, which can lower or prevent the formation of an emulsion between the mineral acid and hydrocarbons present in the formation.

If a solvent is used in the formulation, the solvent typically comprises an alcohol or a glycol ether.

The proportion of the various components of a composition of the present invention will vary depending on the characteristics of the formation to be treated, the acid to be used, and other factors well known in the art. Typical concentration ranges for an aqueous composition of the present invention comprising CHl as a first acid are as follows (percentages are by weight):

| | |
|---|---|
| HCl | 5–28% |
| hydroxyethylaminocarboxylic acid | 0.5–10% |
| additives (e.g. wetting agents, non-emulsifiers, or solvents) | 0.1–10% |
| water | 70–95% |

In addition to being effective as iron control agents, hydroxyethylaminocarboxylic acids have the advantage of being effective in acidizing treatment of a formation without the use of a first acid. In addition, they can readily remove scale from tubing and the well bore. In such an aqueous composition, a small amount of a mineral acid, an organic acid, or a base can be added to provide pH control of the composition. Typical concentration ranges for such an aqueous composition are as follows (percentages are by weight):

| | |
|---|---|
| hydroxyethylaminocarboxylic acid | 1–30% |
| pH controller | 0.1–15% |
| other additives | 0.1–5% |
| water | 50–95% |

Preferably, the hydroxyethylaminocarboxylic acid is present at about 10–30 wt %.

Specific Types of Formations and Damage Treated

The efficiency of a matrix treatment depends primarily upon removing or bypassing regions of low permeability that restrict productivity. This restriction is generally shown by an overall diminished production level or a sharper-than-expected decline in production. Pressure transient analysis is a common technique for estimating the extent of damage.

The physical characteristics and the chemical composition of the damage determine the selection of the proper treating fluid. Therefore, a fluid that is effective against one type of damage will generally be effective against the same type of damage arisen from a different source. The sources of formation damage include: drilling, cementing, completion, gravel packing, production, stimulation, and injection. At least eight basic types of damage are known to occur. These are: emulsion, wettability change, water block, scales (inorganic deposits), organic deposits, mixed deposits, silts and clays, and bacteria. A preferred conventional technique to treat emulsion-based damage is to break or destabilize the emulsion.

Scales are precipitated mineral deposits, and can form when incompatible waters combine, e.g., formation water and either a fluid filtrate or injection water. The most common type of scale is carbonate scales: $CaCO_3$, and $FeCO_3$, of which the former is by far the most common. The fluids and methods of the present invention are readily operable on carbonate scales. Other types of scales treatable by the fluids and techniques of the present invention include chloride scales (e.g., NaCl), iron scales (e.g., FeS, $Fe_2O_3$), silica scales (e.g., $SiO_2$), sulfate scales (e.g. $CaSO_4$), and hydroxide scales (e.g., $Mg(OH)_2$).

Removal of Drilling Mud

The well treatment fluid compositions of the present invention can be used to remove drilling mud from the wellbore. Removal of drilling mud occurs especially readily if the mud contains carbonates, especially calcium carbonate. Removal of drilling mud can be performed by any technique know in the art, and involves the steps of injecting a well treatment fluid composition of the present invention into the wellbore.

Matrix Acidizing Treatment

The well treatment fluid compositions of the present invention can be used in matrix acidizing of subterranean formations surrounding wellbores. Such matrix acidizing methods generally involve pumping the acid-containing well treatment composition down the wellbore and out through perforations into the target formation. Packers can be used in the wellbore to control the formation zones into which the treatment fluid is injected from the wellbore, if the well has perforations in more than one zone. After the composition has been injected into the formation, optionally the well can be shut in for a period of time to allow more complete reaction between the acid and the formation material. The desired result of the treatment is an increase in the permeability of the formation, for example by the creation or enlargement of passageways through the formation, and therefore an increase in the rate of production of formation fluids such as oil and gas.

Parameters such as pumping rate, pumping time, shut-in time, acid content, and additive package, must be determined for each particular treatment since each of these parameters depends upon the extent of the damage, formation geology (e.g., permeability), formation temperature, depth of the producing zone, etc. A well-treatment designer of ordinary skill is familiar with the essential features of matrix acidizing treatments. For discussions of varying levels of generality, the skilled designer is referred to the following U.S. Patents: U.S. Pat. No. 5,203,413, Product and Process for Acid Diversion in the Treatment of Subterranean Formations; U.S. Pat. No. 4,574,050, Method for Preventing the Precipitation of Ferric Compounds During the Acid Treatment of Wells; U.S. Pat. No. 4,695,389, Aqueous Gelling and/or Foaming Agents for Aqueous Acids and Methods of Using the Same; U.S. Pat. No. 4,448,708, Use of Quaternized Polyamidoamines as Demulsifiers; U.S. Pat. No. 4,430,128, Aqueous Acid Compositions and Method of Use; U.S. Pat. No. 3,122,203, Well Washing Process and Composition; U.S. Pat. No. 2,011,579, Intensified Hydrochloric Acid; U.S. Pat. No. 2,094,479, Treatment of Wells, assigned to William E. Spee, 1937; and U.S. Pat. No. 1,877,504, Treatment of Deep Wells. These United States Patents are hereby incorporated by reference in their entirety.

In addition, the skilled designer is directed to the following articles taken from a benchmark treatise in the field of matrix acidizing, and familiar to the skilled designer: M. Economides, Reservoir Justification of Stimulation Techniques, In Reservoir Stimulation, M. Economides and K. G. Nolte, eds. 1-01 (1987); Bernard Piot and Oliver Lietard, Nature of Formation Damage, M. Economides and K. G. Nolte, eds. 12-01 (1987); Laurent Prouvost and Michael Economides, Matrix Acidizing Treatment Evaluation, M. Economides and K. G. Nolte, eds. 16-01 (1987).

The prior art references cited above indicate the level of skill in the art, and establish that the techniques necessary to use a composition of the present invention (e.g., in a typical matrix-treatment protocol) are known in the art.

Use of the well treatment compositions of the present invention in a matrix acidizing process provides for the ready control of iron liberated from the formation, thus helping to minimize the precipitation of iron in the formation or in the wellbore. Further, a well treatment composition of the present invention, comprising a hydroxyethylaminocarboxylic acid as the acidizing component (i.e. an organic acid or a mineral acid is present only in a small amount as a pH controller), is typically capable of further radial penetration into the formation than is usually seen in well treatment compositions wherein a mineral acid is acidizing component.

Fracture Acidizing

One of ordinary skill in the art will recognize that the well treatment compositions of the present invention can be used in the fracture acidizing of a formation. By increasing the pumping pressure (to above the minimum in situ rock stress), a matrix acidizing treatment becomes an acid fracturing treatment. Unlike non-acid fracturing treatments, wherein a proppant is highly desired to hold open the fracture after pumping pressure is released, in acid fracturing treatments, the faces of the fractures formed by the high pressure of pumping are etched by the acid to provide a flowpath for hydrocarbons to the wellbore after pumping pressure is released.

The present invention can be further understood from the following examples.

EXAMPLE 1

Three experimental samples and a control were prepared. The samples and the control were aqueous solutions comprising 15 wt % CHl and 1 wt % Fe (as $FeCl_3$). The samples further comprised sufficient chelating agent to complex all the iron present, specifically (i) 5.6 wt % trisodium hydroxyethylethylenediaminetriacetic acid ($Na_3HEDTA$); (ii) 5.0 wt % trisodium nitrilotriacetic acid ($Na_3NTA$); or (iii) 7.2 wt % tetrasodium ethylenediaminetetraacetic acid ($Na_4EDTA$). It was observed that the $Na_3HEDTA$ and the $Na_3NTA$ solutions remained clear, but the $Na_4EDTA$ sample showed a significant degree of precipitation of the $Na_4EDTA$.

Thereafter, $CaCO_3$ was added to the experimental samples and the control to spend all of the acid and raise the pH to 3.25. The amount of $CaCO_3$ added was to about 10 wt %. Most of the precipitated $Na_4EDTA$ reentered solution as the pH rose. The solutions were then divided into two parts each; a first part was placed in a water bath at 150° F. for 72 hr, and a second part was maintained at room temperature for 72 hr.

Subsequently, the samples were filtered to remove any solids, and [Fe] and [Ca] remaining in solution were measured. It was observed that substantially all the Fe and Ca present in the sample comprising $Na_3HEDTA$ remained in solution (i.e. both metals were fully sequestered by $Na_3HEDTA$) at both room temperature and 150° F., whereas the sample comprising $Na_3NTA$ retained only about 0.76 wt % Fe in solution at room temperature, and the sample comprising Na$_4$EDTA retained only about 6.6 wt % Ca in solution at 150° F. Visual observation showed the volume of precipitate in samples differed in the order Na$_3$NTA>Na$_4$EDTA>Na$_3$HEDTA.

Therefore, Na$_3$HEDTA appears to be superior iron sequestering agent relative to the other two chelating agents, especially to Na$_3$NTA, and the sample comprising Na$_3$HEDTA exhibits substantially no precipitation of Na$_3$HEDTA at highly acidic conditions, which is in contrast to the sample comprising Na$_4$EDTA.

EXAMPLE 2

Samples were prepared substantially as described under Example 1 above. Four samples were prepared, comprising (i) disodium hydroxyethyliminodiacetic acid (Na$_2$HEIDA); (ii) trisodium hydroxyethylethylenediaminetriacetic acid (Na$_3$HEDTA); (ii) trisodium nitrilotriacetic acid (Na$_3$NTA); or (iii) tetrasodium ethylenediaminetetraacetic acid (Na$_4$EDTA). The amount of chelant was equimolar to the amount of ferric iron included in each sample. The samples also comprised 15 wt % HCl, and dissolved ferric iron at 1000 ppm, 2500 ppm, 5000 ppm, 7500 ppm, or 10000 ppm. The solutions were spent to pH 3.5–3.8 by the addition of powdered CaCO$_3$, and thereafter kept for 72 hr at either room temperature or 150° F., after which the concentration of Fe in solution was measured. The results are summarized below:

TABLE 1

| [Fe] at start, ppm | Iron sequestering agent | [Fe] final, room temp., ppm | [Fe] final, 150° F., ppm |
|---|---|---|---|
| 10000 | HEIDA | 2820 | 7470 |
| 7500 |  | 4705 | 5600 |
| 5000 |  | 2370 | 2930 |
| 2500 |  | 1910 | 1030 |
| 1000 |  | 715 | 350 |
| 10000 | HEDTA | 7480 | 8500 |
| 7500 |  | 5910 | 5650 |
| 5000 |  | 3900 | 3600 |
| 2500 |  | 2080 | 1900 |
| 1000 |  | 860 | 680 |
| 10000 | NTA | 3300 | 6850 |
| 7500 |  | 6230 | 5880 |
| 5000 |  | 4000 | 2960 |
| 2500 |  | 1890 | 1130 |
| 1000 |  | 740 | 250 |
| 10000 | EDTA | 7250 | 8250 |
| 7500 |  | 5720 | 6280 |
| 5000 |  | 3190 | 3680 |
| 2500 |  | 1640 | 1460 |
| 1000 |  | 830 | 700 |

These results indicate HEDTA and HEIDA were effective at sequestering iron and minimizing its precipitation.

EXAMPLE 3

The ability of solutions comprising HEDTA or HEIDA to dissolve calcium scales was tested as follows. The following solutions were prepared: (i) 50% w/w water/41% Na$_3$HEDTA in aqueous solution; (ii) 50% w/w water/43% Na$_2$HEIDA in aqueous solution; (iii) 50% w/w water/38% Na$_4$EDTA in aqueous solution. Portions of the solutions were then saturated with either calcite (CaCO$_3$) or gypsum (CaSO$_4$), and kept at 170–175° F. for 24 hr, and [Ca] in solution was then measured. The native pH values of the samples were about 12, but for some of the samples the pH was lowered with CHl. The results are presented in the following table.

TABLE 2

| Chelant | Solid | [Ca], ppm | % Molar Capacity |
|---|---|---|---|
| Na$_3$HEDTA | Calcite | 13000 | 65 |
| Na$_3$HEDTA | Gypsum | 19037 | 88 |
| Na$_3$HEDTA (HCl, 70° F.) | Calcite | 33000 | 150 |
| Na$_3$HEDTA (HCl) | Gypsum | 2131 | 10 |
| Na$_4$EDTA | Calcite | 15351 | 88 |
| Na$_4$EDTA | Gypsum | 16869 | 81 |
| Na$_2$HEIDA | Calcite | 12414 | 33 |
| Na$_2$HEIDA | Gypsum | 17000 | 47 |
| Na$_2$HEIDA (HCl, 70° F.) | Calcite | 9438 | 30 |
| Na$_2$HEIDA (HCl) | Gypsum | 3000 | 10 |

These results indicate that HEDTA and HEIDA can dissolve Ca to an extent comparable to EDTA, on a molar basis for HEDTA and on a weight basis for the lower-molecular-weight HEIDA. Lowering the pH of the solution increased the solubility of calcite in Na$_3$HEDTA (possibly by acid dissolution of the calcite), but decreased the solubility of gypsum in both HEDTA and HEIDA.

EXAMPLE 4

Dynamic core-flood tests were run using standard equipment (Larson Engineering), following techniques known in the art (Fredd, C. N., "The Influence of Transport and React ion on Wormhole Formation in Carbonate Porous Media: A Study of Alternative Stimulation Fluids," Ph.D. Thesis, Univ. of Michigan (1998); Fredd, C. N., and H. S. Fogler, "The Influence of Chelating Agents on the Kinetics of Calcite Dissolution," *J. Coll. & Interface Sci.* 204, 187–197 (1998); Fredd, C. N., and H. S. Fogler, "Alternative Stimulation Fluids and their Impact on Carbonate Acidizing," SPE 31074 (1996); Fredd, C. N., and H. S. Fogler, "Chelating Agents as Effective Matrix Stimulation Fluids for Carbonates," SPE 37212 (1997); and Fredd, C. N., et al., "The Existence of an Optimum Damkholer Number for Matrix Stimulation of Carbonate Formations," SPE 38167 (1997)). To summarize, the equipment comprised a core holder with Hassler sleeve (approximately 1 in diameter×6 in length). Limestone cores (core lengths 14.0–15.4 cm, pore volumes 9.6–11.4 mL, initial permeabilities 27–77 md) were loaded into the core holder. The temperature of the cores was held at 150° F., and samples were added to the core at a flow rate of 5 mL/min. The pour volume to breakthrough ($PV_{bt}$) was estimated from the flat portion of permeability/time curve.

Five hydroxyethylaminocarboxylic acid aqueous solutions were tested: (i) 20% Na$_3$EDTA, pH 12; (ii) 20% Na$_3$HEDTA, pH 4 (adjusted with CHl); (iii) 20% Na$_3$HEDTA, pH 2.5 (adjusted with CHl); (iv) 20% Na$_3$HEDTA, pH 3.5 (adjusted with formic acid); and (v) 13% Na$_2$HEIDA, pH 2.5 (adjusted with HCl). The final permeability, change in permeability, $PV_{bt}$, and concentration of dissolved Ca were measured and are presented below.

TABLE 3

| Solvent | Core length, cm | Pore Vol (mL) | Initial Perm (md) | Final Perm (md) | ΔPerm (md) | Breakthrough vol, (mL) | Ca dissolved, ppm |
|---|---|---|---|---|---|---|---|
| 20% Na₃HEDTA, pH 12 | 14.3 | 11 | 70 | 175 | 115 | 350 | 18000 |
| 20% Na₃HEDTA, pH 4 (HCl) | 14.9 | 11.4 | 77 | 218 | 141 | 300 | 23000 |
| 20% Na₃HEDTA, pH 2.5 (HCl) | 14.0 | 10.1 | 68 | 403 | 335 | 230 | 24000 |
| 20% Na₃HEDTA, pH 3.5 (formic acid) | 15.0 | 9.6 | 51 | 364 | 315 | 110 | 39780 |
| 13% Na₂HEIDA pH 2.5 (HCl) | 15.4 | 10.4 | 27 | 101 | 74 | 300 | 3400 |

The data shown in Table 3 demonstrate that all of the chelant solutions substantially increased the permeability of the core, thus providing evidence of stimulation.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A well treatment fluid composition, comprising:
    a first acid in an amount from about 15 wt % to about 28 wt % of the composition;
    water; and hydroxyethyliminodiacetic acid (HEIDA) or a salt thereof.

2. The composition of claim 1, wherein the first acid is selected from CHl, HF, formic acid, acetic acid, or mixtures thereof.

3. The composition of claim 1, further comprising hydroxyethylethylenediaminetriacetic acid (HEDTA).

4. The composition of claim 3, wherein the hydroxyethyliminodiacetic acid (HEIDA) is in a form selected from a free acid, a sodium salt, a potassium salt, or an ammonium salt.

5. The composition of claim 1, wherein the hydroxyethyliminodiacetic acid (HEIDA) comprises from about 0.5 wt % to about 10 wt % of the composition.

6. The composition of claim 1, further comprising a corrosion inhibitor.

7. The composition of claim 6, wherein the corrosion inhibitor comprises a quaternary ammonium compound and at least one of an unsaturated oxygen compound or a reduced sulfur compound.

8. The composition of claim 1, further comprising an additive selected from a wetting agent, an emulsifier, an agent preventing the formation of an emulsion, a solvent, or a mixture thereof.

9. A method of acid-treating a subterranean formation, comprising:
    injecting a well treatment fluid composition via a wellbore into a subterranean formation, the well treatment fluid composition comprising:
        a first acid in an amount from about 15 w % to about 28 w %;
        water; and
        hydroxyethyliminodiacetic acid (HEIDA).

10. The method of claim 9, wherein the first acid is selected from CHl, HF, formic acid, acetic acid, or mixtures thereof.

11. The method of claim 9, further comprising hydroxyethylethylenediaminetriacetic acid (HEDTA).

12. The method of claim 11, wherein the hydroxyethylaminocarboxylic acid is in a form selected from a free acid, a sodium salt, a potassium salt, or an ammonium salt.

13. The method of claim 11, wherein the hydroxyethylaminocarboxylic acid comprises from about 0.5 wt % to about 10 wt % of the composition.

14. The method of claim 9, further comprising a corrosion inhibitor.

15. The method of claim 14, wherein the corrosion inhibitor comprises a quaternary ammonium compound and at least one of an unsaturated oxygen compound or a reduced sulfur compound.

16. The method of claim 9, wherein the composition further comprises an additive selected from a wetting agent, an emulsifier, an agent preventing the formation of an emulsion, a solvent, or a mixture thereof.

17. A method of removing alkaline earth carbonate scale from a wellbore, comprising:
    injecting a well treatment fluid composition via the wellbore, the well treatment fluid composition comprising:
        a first acid;
        water;
        a hydroxyethylaminocarboxylic acid; and
        a corrosion inhibitor comprising a quaternary ammonium compound and a reduced sulfur compound.

18. The method of claim 17, wherein the first acid is selected from CHl, HF, formic acid, acetic acid, or mixtures thereof.

19. The method of claim 18, wherein the first acid is a mixture of CHl and formic acid.

20. The method of claim 17, wherein the first acid comprises from about 0.1 wt % to about 15 wt % of the composition.

21. The method of claim 17, wherein the hydroxyethylaminocarboxylic acid is selected from hydroxyethylethylenediaminetriacetic acid (HEDTA), hydroxyethyliminodiacetic acid (HEIDA), or a mixture thereof.

22. The method of claim 21, wherein the hydroxyethylaminocarboxylic acid is hydroxyethylethylenediaminetriacetic acid (HEDTA).

23. The method of claim 21, wherein the hydroxyethylaminocarboxylic acid is in a form selected from a free acid, a sodium salt, a potassium salt, or an ammonium salt.

24. The method of claim 21, wherein the hydroxyethylaminocarboxylic acid comprises from about 1 wt % to about 30 wt % of the composition.

25. The method of claim 17, wherein the wellbore is at a temperature from about 150° F. to about 325° F.

26. The method of claim 17, wherein the composition further comprises an additive selected from a wetting agent, an emulsifier, an agent preventing the formation of an emulsion, a solvent, or a mixture thereof.

27. The method of claim 17, wherein the alkaline earth carbonate is present in a gravel pack or screen.

28. A method of matrix-acidizing a sandstone or carbonate subterranean formation, comprising:
injecting a well treatment fluid composition via a wellbore into a subterranean formation, the well treatment fluid composition consisting of:
water;
a pH controller agent to adjust the pH of the treatment fluid between to about 1 to about 12;
a hydroxyethylaminocarboxylic acid present in an amount from about 10 wt % to about 30 wt %; and
optionally an additive selected from the group consisting of a wetting agent, an emulsifier, an agent preventing the formation of an emulsion, a solvent, a corrosion inhibitor and a mixture thereof;
said matrix-acidizing resulting in the formation of wormholes due to the dissolution of minerals naturally-present in the formation.

29. The method of claim 28, wherein the injecting is performed at a pressure from about 14 psi to about 10,000 psi.

30. The method of claim 28, wherein the pH is from about 1 to about 4.

31. The method of claim 28, wherein the pH controller agent is selected from the group consisting of an organic acid, a mineral acid, and a base.

32. The method of claim 31, wherein the organic acid and the mineral acid are selected from the group consisting of HCl, HF, formic acid, acetic acid, and mixtures thereof.

33. The method of claim 31, wherein the base is selected from sodium hydroxide, potassium hydroxide, ammonia, or mixtures thereof.

34. The method of claim 28, wherein the hydroxyethylaminocarboxylic acid is selected from hydroxyethylethylenediaminetriacetic acid (HEDTA), hydroxyethyliminodiacetic acid (HEIDA), or a mixture thereof.

35. The method of claim 34, wherein the hydroxyethylaminocarboxylic acid is hydroxyethylethylenediaminetriacetic acid (HEDTA).

36. The method of claim 34, wherein the hydroxyethylaminocarboxylic acid is in a form selected from a free acid, a sodium salt, a potassium salt, or an ammonium salt.

37. The method of claim 28, wherein the composition further comprises a corrosion inhibitor.

38. The method of claim 37, wherein the corrosion inhibitor comprises a quaternary ammonium compound and at least one of an unsaturated oxygen compound or a reduced sulfur compound.

39. The method of claim 28, wherein the formation is at a temperature from about 100° F. to about 350° F.

40. A method of removing drilling mud from a wellbore, comprising:
injecting a well treatment fluid composition via the wellbore, the well treatment fluid composition comprising:
a first acid in an amount from about 15 wt % to about 28 wt %;
water;
a hydroxyethylaminocarboxylic acid in an amount from about 0.5 wt % to about 10 wt % of the composition; and
a corrosion inhibitor.

41. The method of claim 40, wherein the first acid is selected from CHl, HF, formic acid, acetic acid, or mixtures thereof.

42. The method of claim 41, wherein the first acid is a mixture of HCl and formic acid.

43. The method of claim 40, wherein the hydroxyethylaminocarboxylic acid is selected from hydroxyethylethylenediaminetriacetic acid (HEDTA), hydroxyethyliminodiacetic acid (HEIDA), or a mixture thereof.

44. The method of claim 43, wherein the hydroxyethylaminocarboxylic acid is hydroxyethylethylenediaminetriacetic acid (HEDTA).

45. The method of claim 43, wherein the hydroxyethylaminocarboxylic acid is in a form selected from a free acid, a sodium salt, a potassium salt, or an ammonium salt.

46. The method of claim 40, wherein the wellbore is at a temperature from about 150° F. to about 325° F.

47. The method of claim 40, wherein the corrosion inhibitor comprises a quaternary ammonium compound and at least one of an unsaturated oxygen compound or a reduced sulfur compound.

48. The method of claim 40, wherein the composition further comprises an additive selected from a wetting agent, an emulsifier, an agent preventing the formation of an emulsion, a solvent, or a mixture thereof.

49. The method of claim 28 wherein the pH controller is in the range of 0.5 to about 7 wt %.

* * * * *

UNITED STATES PATENT AND TRADEMARK OFFICE
CERTIFICATE OF CORRECTION

PATENT NO. : 6,436,880 B1
DATED : August 20, 2002
INVENTOR(S) : Wayne W. Frenier It is certified that error appears in the above-identified patent and that said Letters Patent is hereby corrected as shown below:

Column 2,
Line 59, delete "CH1 and insert -- HC1 --

Column 3,
Line 43, delete "CH1" and insert -- HC1 --

Column 4,
Line 28, delete "CH1" and insert -- HC1 --

Column 6,
Lines 11 and 21, delete "CH1" and insert -- HC1 --

Column 8,
Line 43, delete "CH1" and insert -- HC1 --

Column 10,
Lines 2, 63, and 64, delete "CH1" and insert -- HC1 --

Column 11,
Lines 33 and 64, delete "CH1" and insert -- HC1 --

Column 12,
Lines 42 and 45, delete "CH1" and insert -- HC1 --

UNITED STATES PATENT AND TRADEMARK OFFICE
CERTIFICATE OF CORRECTION

PATENT NO. : 6,436,880 B1
DATED : August 20, 2002
INVENTOR(S) : Wayne W. Frenier It is certified that error appears in the above-identified patent and that said Letters Patent is hereby corrected as shown below:

Column 14,
Line 19, delete "CH1" and insert -- HC1 --

Signed and Sealed this

Fourth Day of February, 2003

JAMES E. ROGAN
*Director of the United States Patent and Trademark Office*